United States Patent
Xu

(10) Patent No.: US 11,187,201 B1
(45) Date of Patent: Nov. 30, 2021

(54) ION CURRENT SENSING FOR ESTIMATION OF COMBUSTION PHASING IN AN INTERNAL COMBUSTION ENGINE

(71) Applicant: Shuonan Xu, Troy, MI (US)

(72) Inventor: Shuonan Xu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/170,113

(22) Filed: Feb. 8, 2021

(51) Int. Cl.
- F02D 35/02 (2006.01)
- F02P 5/153 (2006.01)
- F02P 5/15 (2006.01)
- F02P 17/12 (2006.01)

(52) U.S. Cl.
CPC .............. *F02P 5/15* (2013.01); *F02D 35/021* (2013.01); *F02D 35/024* (2013.01); *F02D 35/028* (2013.01); *F02P 5/153* (2013.01); *F02P 2017/125* (2013.01)

(58) Field of Classification Search
CPC .... F02D 35/021; F02D 35/024; F02D 35/028; F02P 5/153; F02P 2017/125
USPC .......................... 123/406.42, 406.43, 406.19
See application file for complete search history.

(56) References Cited

U.S. PATENT DOCUMENTS

| | | | |
|---|---|---|---|
| 7,231,906 B1 | 6/2007 | Haskara et al. | |
| 7,779,679 B2 * | 8/2010 | Wang | F02D 35/028 73/114.52 |
| 10,030,602 B2 | 7/2018 | Vaughan | |
| 2004/0084018 A1 * | 5/2004 | Zhu | F02P 3/051 123/406.14 |
| 2004/0084020 A1 * | 5/2004 | Daniels | F02P 5/152 123/406.23 |
| 2004/0094124 A1 * | 5/2004 | Viele | F02P 17/12 123/406.27 |
| 2006/0042355 A1 * | 3/2006 | Zhu | F02D 41/009 73/35.08 |
| 2006/0069493 A1 * | 3/2006 | Attard | F02D 35/028 701/106 |
| 2006/0169243 A1 * | 8/2006 | Neunteufl | F02D 41/3076 123/295 |
| 2007/0186903 A1 * | 8/2007 | Zhu | F02D 41/0255 123/406.37 |
| 2009/0182485 A1 * | 7/2009 | Loeffler | F02D 41/3064 701/103 |

(Continued)

OTHER PUBLICATIONS

Steven W. Smith, "The Scientist and Engineer's Guide to Digital Signal Processing", Chapter 15 Moving Average Filters, pp. 277-278, California Technical Publishing, 1997.*

*Primary Examiner* — Erick R Solis
(74) *Attorney, Agent, or Firm* — Ralph E. Smith

(57) ABSTRACT

A combustion control system for an engine of a vehicle includes an ion sensing system configured to generate an ion current signal indicative of a measured current across electrodes of a spark plug associated with a cylinder of the engine and a controller configured to monitor for peaks in the ion current signal and, upon detecting at least a first peak and a second peak in the ion current signal, estimate a location of peak pressure (LPP) based on the detected second peak in the ion current signal, estimate an angle (CA50) of a crankshaft of the engine at which approximately 50% of the heat generated during combustion in the cylinder of the engine is released, and control combustion phasing of the engine based on the estimated CA50 angle.

14 Claims, 3 Drawing Sheets

(56) References Cited

U.S. PATENT DOCUMENTS

2016/0025028 A1* 1/2016 Vaughan ............... F02D 41/263
                                                                         701/105

* cited by examiner

ION CURRENT SENSING FOR ESTIMATION OF COMBUSTION PHASING IN AN INTERNAL COMBUSTION ENGINE

FIELD

The present application generally relates to internal combustion engines and, more particularly, to techniques for using ion current sensing for estimation of combustion phasing in internal combustion engines.

BACKGROUND

An internal combustion engine compresses and combusts an air/fuel mixture within a cylinder to drive a piston that rotatably turns a crankshaft to generate drive torque. The compressed air/fuel mixture is ignited by a spark that is generated by an ignition system. The timing of the spark and the resulting combustion phasing with respect to a rotational angle of the crankshaft, affects the torque generated by the engine as well as the efficiency with which it is generated. Thus, precise ignition timing control is necessary. Typically, combustion control is based on a crankshaft angle at which approximately 50% of the heat generated during combustion is released (also known as "CA50"). Conventional engines typically utilize in-cylinder pressure transducers or sensors to detect peak in-cylinder pressure, which is used to estimate the CA50 angle. These sensors, however, increase vehicle costs. Accordingly, while such combustion control systems do work well for their intended purpose, there remains a desire for improvement in the relevant art.

SUMMARY

According to one example aspect of the invention, a combustion control system for an engine of a vehicle is presented. In one exemplary implementation, the system comprises an ion sensing system configured to generate an ion current signal indicative of a measured current across electrodes of a spark plug associated with a cylinder of the engine and a controller configured to monitor for peaks in the ion current signal and, upon detecting at least a first peak and a second peak in the ion current signal, estimate a location of peak pressure (LPP) based on the detected second peak in the ion current signal, estimate an angle (CA50) of a crankshaft of the engine at which approximately 50% of the heat generated during combustion in the cylinder of the engine is released, and control combustion phasing of the engine based on the estimated CA50 angle.

In some implementations, the controller is further configured to cycle average the ion current signal to reduce noise and obtain an averaged ion current signal and detect the second peak in the averaged ion current signal. In some implementations, the controller is further configured to detect the second peak in the averaged ion current signal by applying a symmetric moving average filter. In some implementations, the symmetric moving average filter does not change phasing of the averaged ion current signal.

In some implementations, the controller is further configured to not estimate the LPP or estimate the CA50 crankshaft angle when the detected second peak is greater than a threshold distance from a first peak indicative of ringing after ignition of an air/fuel charge within the cylinder. In some implementations, the threshold distance is calibrated as a function of engine speed.

In some implementations, the controller is configured to estimate the CA50 crankshaft angle using a calibrated model and based on the LPP and cylinder air charge. In some implementations, the engine does not include pressure transducers or sensors for cylinders of the engine. In some implementations, the controller does not utilize an artificial neural network (ANN) to estimate the CA50 crankshaft angle.

According to another example aspect of the invention, a combustion control method for an engine of a vehicle is presented. In one exemplary implementation, the method comprises obtaining, by a controller of the engine and from an ion sensing system of the engine, an ion current signal indicative of a measured current across electrodes of a spark plug associated with a cylinder of the engine and monitoring, by the controller, for peaks in the ion current signal and, upon detecting at least a first peak and a second peak in the ion current signal, estimating, by the controller, a LPP based on the detected second peak in the ion current signal, estimating, by the controller, a CA50 angle of a crankshaft of the engine at which approximately 50% of the heat generated during combustion in the cylinder of the engine is released, and controlling, by the controller, combustion phasing of the engine based on the estimated CA50 angle.

In some implementations, the method further comprises cycle averaging, by the controller, the ion current signal to reduce noise and obtain an averaged ion current signal and detecting, by the controller, the second peak in the averaged ion current signal. In some implementations, the method further comprises detecting, by the controller, the second peak in the averaged ion current signal by applying a symmetric moving average filter. In some implementations, the symmetric moving average filter does not change phasing of the averaged ion current signal.

In some implementations, the method further comprises not estimating, by the controller, the LPP or the CA50 crankshaft angle when the detected second peak is greater than a threshold distance from a first peak indicative of ringing after ignition of an air/fuel charge within the cylinder. In some implementations, the threshold distance is calibrated as a function of engine speed.

In some implementations, the method further comprises estimating, by the controller, the CA50 crankshaft angle using a calibrated model and based on the LPP and cylinder air charge. In some implementations, the engine does not include pressure transducers or sensors for cylinders of the engine. In some implementations, estimating the CA50 crankshaft angle does not involve the use of an ANN.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DETAILED DESCRIPTION

As previously mentioned, conventional engines typically utilize in-cylinder pressure transducers or sensors to detect the location of peak in-cylinder pressure, which is used to estimate the CA50 crankshaft angle. These sensors, however, increase vehicle costs. Other techniques utilize complex artificial neural networks (ANNs) to estimate the CA50 crankshaft angle, but this requires substantial processing throughput. Accordingly, improved combustion control systems and methods are presented. These systems and methods utilize the ion current signal generated by an ion sensing system and analyze the ion current signal to identify a second ion peak generated by the release of ion through thermal reactions. This second peak is highly correlated to a location of peak pressure (LPP) point and thus can be used to accurately estimate the same. Finally, the estimated LPP is utilized to estimate the CA50 crankshaft angle, which is then utilized for improved combustion phasing control and improved engine efficiency without the need for expensive pressure transducers or sensors or complex ANNs.

Figure 1:
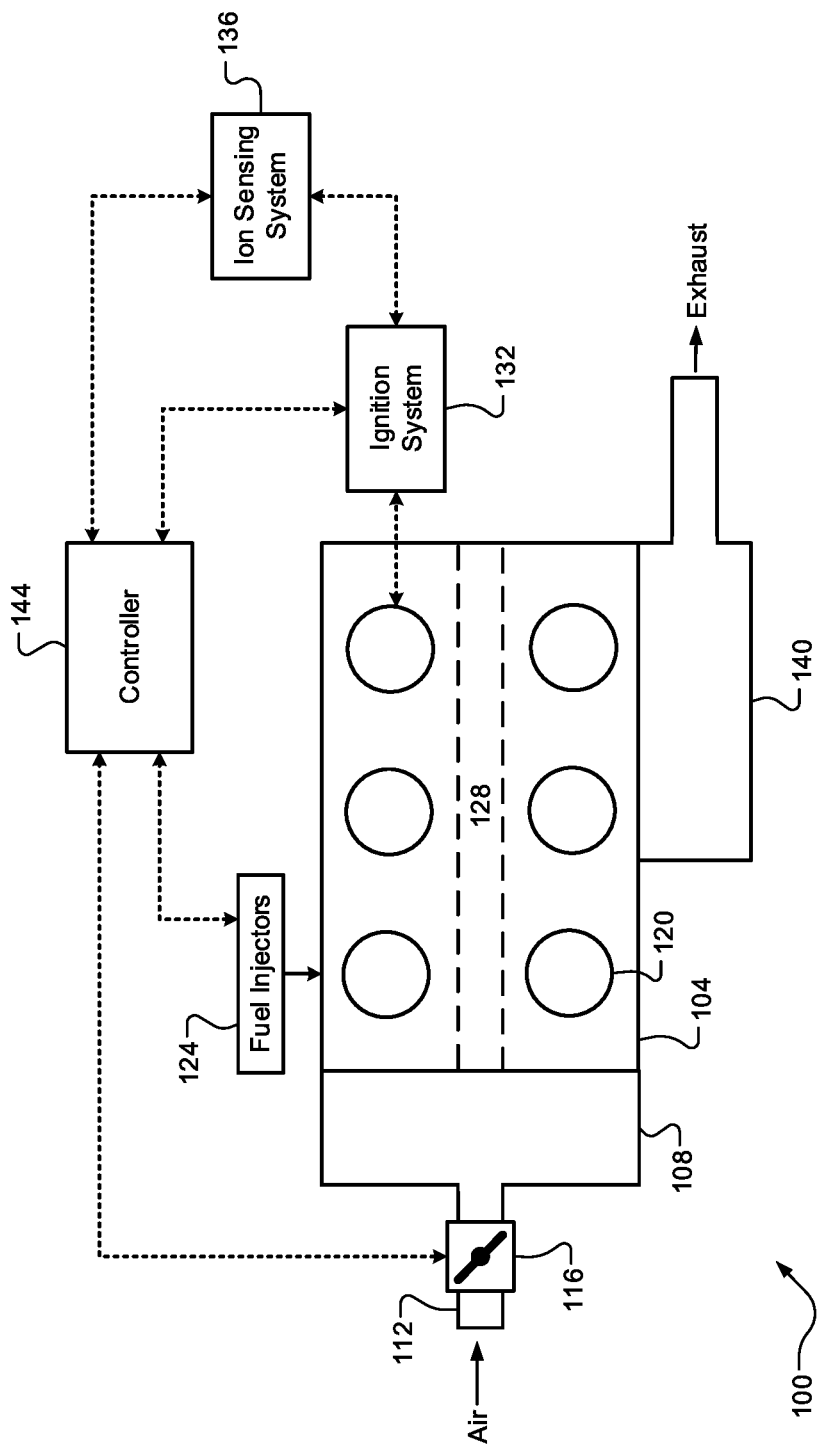
FIG. 1 is a diagram of a vehicle having an example combustion control system according to the principles of the present application.

Referring now to FIG. 1, a diagram of a vehicle 100 comprising an engine 104 according to the principles of the present application is illustrated. The engine 104 draws air into an intake manifold 108 through an induction system 112 that is regulated by a throttle valve 116. Air charges are then provided from the intake manifold 108 to each cylinder 120 of the engine 104 and the air charges are combined with fuel from fuel injectors 124 to form an air/fuel charge. The air/fuel charge is compressed by pistons (not shown) and ignited by spark generated by an ignition system 132 comprising a plurality of spark plugs (not shown), which drives the pistons and rotatably turns a crankshaft 128 to generate drive torque for vehicle propulsion. The drive torque could be transferred, for example, to a driveline (not shown) via a transmission (not shown).

An ion sensing system 136, which could be part of the larger spark ignition system 132 or separate as shown, is configured to measure and generate a signal indicative of current flow (versus crank angle degrees) in a post-combustion ion trail between electrodes of the spark plugs associated with the cylinders 120. The term "ion sensing" refers to the principle that electrical current flow in an ionized gas is proportional to the flame electrical conductivity. The ion sensing system 136 is typically utilized for accurate and reliable knock/misfire detection and mitigation (i.e., no ions are created in the presence of a misfire) compared to other methods (e.g., crankshaft monitoring). Thus, by utilizing the existing ion sensing system 136, no additional pressure transducers or sensors for each cylinder 120 of the engine 104 are necessary, which decreases costs. Exhaust gas resulting from combustion is expelled into an exhaust system 140. A controller 144 controls operation of the engine 104, including implementing the CA50 estimation techniques of the present application as will now be more fully illustrated and discussed.

Figure 2A:
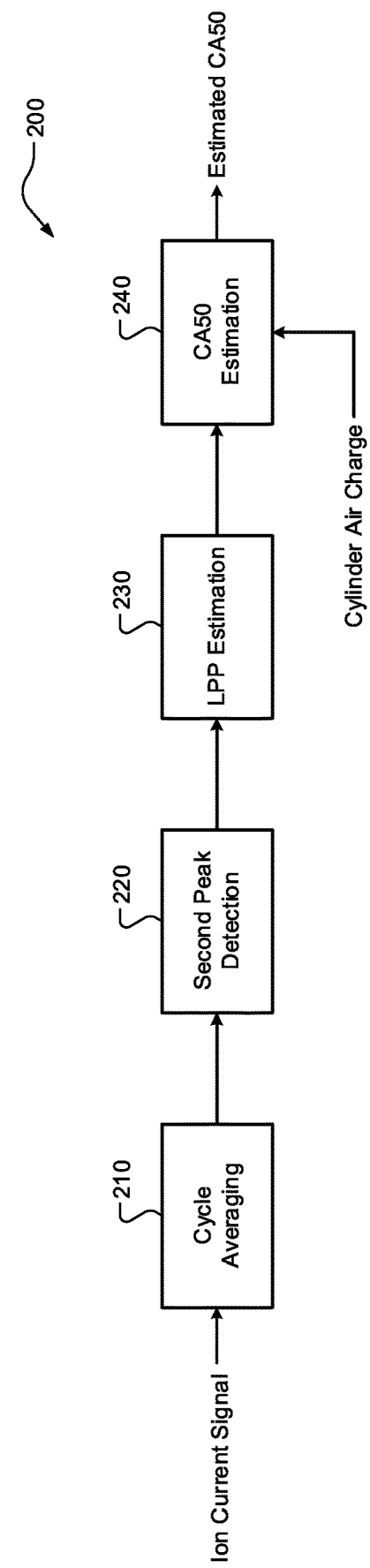
FIGS. 2A-2B are functional block diagrams of an example combustion control system architecture according to the principles of the present application.
Figure 2B:
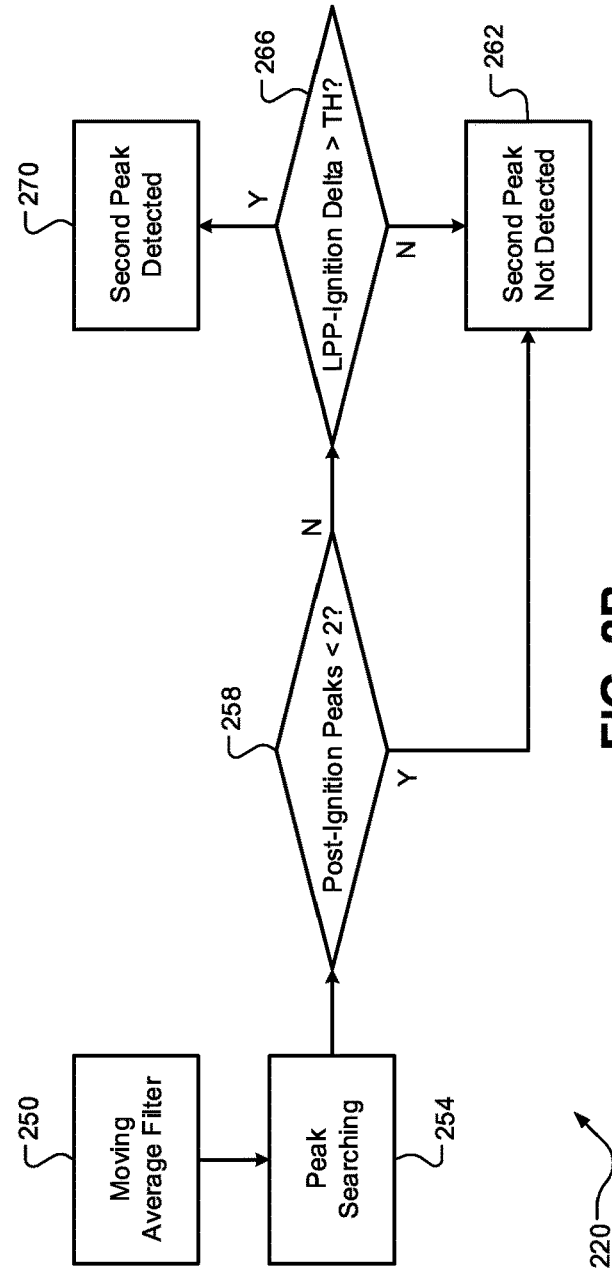

Referring now to FIGS. 2A-2B, functional block diagrams of an example combustion control system architecture 200 according to the principles of the present application are illustrated. Initially, the ion current signal (raw or unfiltered) is obtained by the controller 144. At 210, the ion current signal is cycle averaged to reduce noise and obtain an averaged ion current signal. At 220, second peak detection in the averaged ion current signal is performed. In some cases, as will be discussed in greater detail below, the second peak cannot be detected and thus the CA50 estimation will not be completed for that particular cycle/event. At 230, provided the second peak is successfully detected at 220, the LPP point is estimated based on the detected second peak. Finally, at 240, the CA50 crankshaft angle is estimated based on the estimated LPP and the cylinder air charge (e.g., using a calibrated two-dimensional surface or model).

FIG. 2B more fully depicts the second peak detection 220. At 250, a moving average filter is applied to the averaged ion current signal. In one exemplary implementation, the moving average filter is a symmetric moving average filter such that it does not change phasing of the averaged ion current signal. For example only, the moving average filter could be a 7 point symmetric moving average filter with a current point and 3 points before and after the current point. At 254, peak searching is performed on the filtered ion current signal. Pre-ignition peaks can also be ignored.

At 258, it is determined whether the quantity of detected peaks in the filtered ion current signal is less than two. When true, the second peak is not detected at 262. In other words, only one peak was identified during the peak searching. When false, or when there are two or more detected peaks, it is determined at 266 whether a distance (e.g., in crankshaft angle degrees) between the estimated LPP and the ignition point is greater than a threshold. In one exemplary implementation, this threshold is calibrated as a function of engine speed as accuracy could tend to decrease at lower engine speeds. When true, the second peak is successfully detected at 270. When false, the second peak is not detected at 262. The use of such a threshold can further provide for decreased false peak detections due to noise.

Figure 3:
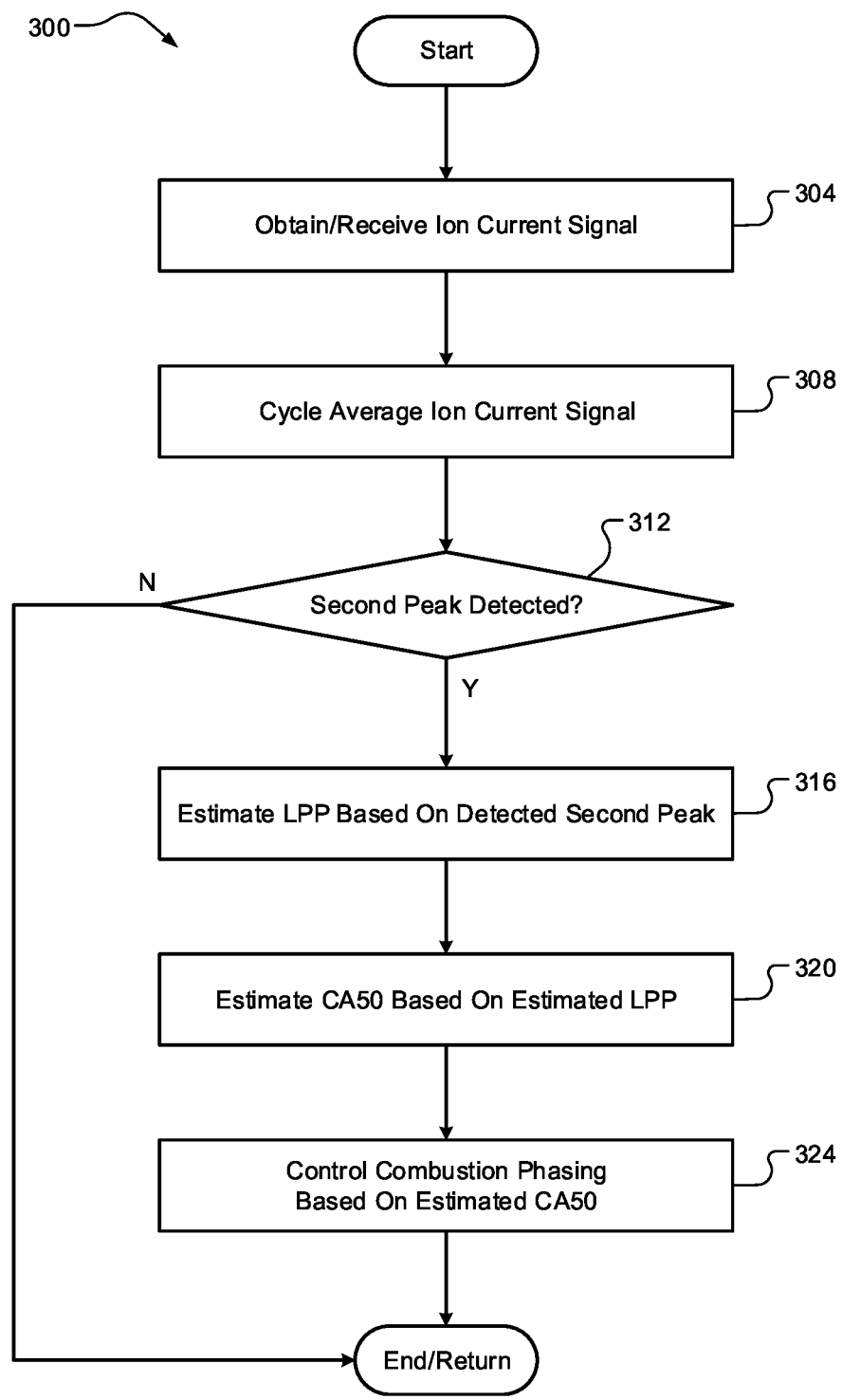
FIG. 3 is a flow diagram of an example combustion control method according to the principles of the present application.

Referring now to FIG. 3, a flow diagram of an example combustion control method 300 according to the principles of the present application is illustrated. While described with respect to the engine 104 and its components, it will be appreciated that the method 300 could be applicable to any suitable spark ignition engine system. At 304, the controller 144 receives the ion current signal (raw or unfiltered) from the ion sensing system 136. At 308, the controller 144 cycle averages the ion current signal to reduce or eliminate noise therefrom and obtain an averaged ion current signal. At 312, the controller 144 performs second peak detection. When the second peak is successfully detected, the method 300 proceeds to 316. Otherwise, the method 300 ends or returns to 304 for another cycle. At 316, the controller 144 estimates the LPP based on the detected second peak.

As previously discussed, the locations or positions (in crank angle degrees) of these points are highly correlated. At 320, the controller 144 estimates the CA50 crankshaft angle based on the estimated LPP. As previously discussed, this estimation could be made using a calibrated model or two-dimensional surface that also utilizes cylinder air charge as an input to further improve estimation accuracy. Finally, at 324, the controller 144 utilizes the estimated CA50 crankshaft angle for improved combustion phasing control and improved engine performance. This combustion phasing control could include controlling airflow/fuel/spark timing to attempt to achieve optimal combustion. The method 300 then ends or returns to 304 for another cycle.

It will be appreciated that the term "controller" as used herein refers to any suitable control device(s) that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A combustion control system for an engine of a vehicle, the system comprising:
   an ion sensing system configured to generate an ion current signal indicative of a measured current across electrodes of a spark plug associated with a cylinder of the engine; and
   a controller configured to monitor for peaks in the ion current signal and, upon identifying at least a first peak and a second peak in the ion current signal:
      estimate a location of peak pressure (LPP) based on the detected second peak in the ion current signal;
      estimate an angle (CA50) of a crankshaft of the engine at which approximately 50% of the heat generated during combustion in the cylinder of the engine is released;
      control combustion phasing of the engine based on the estimated CA50 angle;
      cycle average the ion current signal to reduce noise and obtain an averaged ion current signal;
      detect the second peak in the averaged ion current signal; and
      not estimate the LPP or estimate the CA50 crankshaft angle when the detected second peak is greater than a threshold distance from a first peak indicative of ringing after ignition of an air/fuel charge within the cylinder.

2. The system of claim 1, wherein the controller is further configured to detect the second peak in the averaged ion current signal by applying a symmetric moving average filter.

3. The system of claim 2, wherein the symmetric moving average filter does not change phasing of the averaged ion current signal.

4. The system of claim 1, wherein the threshold distance is calibrated as a function of engine speed.

5. The system of claim 1, wherein the controller is configured to estimate the CA50 crankshaft angle using a calibrated model and based on the LPP and cylinder air charge.

6. The system of claim 1, wherein the engine does not include pressure transducers or sensors for cylinders of the engine.

7. The system of claim 1, wherein the controller does not utilize an artificial neural network (ANN) to estimate the CA50 crankshaft angle.

8. A combustion control method for an engine of a vehicle, the method comprising:
   obtaining, by a controller of the engine and from an ion sensing system of the engine, an ion current signal indicative of a measured current across electrodes of a spark plug associated with a cylinder of the engine; and
   monitoring, by the controller, for peaks in the ion current signal and, upon identifying, by the controller, at least a first peak and a second peak in the ion current signal:
      estimating, by the controller, a location of peak pressure (LPP) based on the detected second peak in the ion current signal;
      estimating, by the controller, an angle (CA50) of a crankshaft of the engine at which approximately 50% of the heat generated during combustion in the cylinder of the engine is released;
      controlling, by the controller, combustion phasing of the engine based on the estimated CA50 angle;
      cycle averaging, by the controller, the ion current signal to reduce noise and obtain an averaged ion current signal; and
      detecting, by the controller, the second peak in the averaged ion current signal; and
      not estimating, by the controller, the LPP or the CA50 crankshaft angle when the detected second peak is greater than a threshold distance from a first peak indicative of ringing after ignition of an air/fuel charge within the cylinder.

9. The method of claim 8, further comprising detecting, by the controller, the second peak in the averaged ion current signal by applying a symmetric moving average filter.

10. The method of claim 9, wherein the symmetric moving average filter does not change phasing of the averaged ion current signal.

11. The method of claim 8, wherein the threshold distance is calibrated as a function of engine speed.

12. The method of claim 8, further comprising estimating, by the controller, the CA50 crankshaft angle using a calibrated model and based on the LPP and cylinder air charge.

13. The method of claim 8, wherein the engine does not include pressure transducers or sensors for cylinders of the engine.

14. The method of claim 8, wherein estimating the CA50 crankshaft angle does not involve the use of an artificial neural network (ANN).

* * * * *